United States Patent [19]

Herman

[11] 4,245,267
[45] Jan. 13, 1981

[54] SUSPENSION DEVICE FOR MAGNETIC TRANSDUCERS

[75] Inventor: Robert W. Herman, Laguna Beach, Calif.

[73] Assignee: New World Computer Company, Inc., Costa Mesa, Calif.

[21] Appl. No.: 44,536

[22] Filed: Jun. 1, 1979

[51] Int. Cl.³ .................... G11B 5/60; G11B 17/32; G11B 21/20
[52] U.S. Cl. ..................... 360/104; 360/103
[58] Field of Search ............ 360/104, 103, 102, 109; 248/585; 267/160, 163

[56] References Cited

U.S. PATENT DOCUMENTS

| | | | |
|---|---|---|---|
| 3,177,495 | 4/1965 | Felts | 360/104 |
| 3,489,381 | 1/1970 | Jones et al. | 360/104 |
| 3,581,298 | 5/1971 | Billawala | 360/104 |
| 3,582,920 | 6/1971 | Billawala | 360/104 |
| 3,593,326 | 7/1971 | Turner et al. | 360/104 |
| 3,593,330 | 7/1971 | Ackley | 360/104 |
| 3,599,193 | 8/1971 | Cote et al. | 360/103 |
| 3,702,461 | 11/1972 | Cantwell | 360/104 |
| 3,975,770 | 8/1976 | Spash et al. | 360/103 |
| 4,058,843 | 11/1977 | Gyi | 360/103 |
| 4,141,050 | 2/1979 | Wisely | 360/104 |

Primary Examiner—Alfred H. Eddleman
Attorney, Agent, or Firm—Lyon & Lyon

[57] ABSTRACT

A suspension device is disclosed which is formed from a single thickness of resilient material for urging a plurality of magnetic heads toward a moving magnetic surface. The suspension device comprises a base area adapted to be affixed to a support structure, a plurality of adjacent gimbal sets each having a first sinuous gimbal member and a second sinuous gimbal member, and a plurality of leaf spring members that join the gimbal sets to the base area. The sinuous gimbal members each further comprise a plurality of laterally adjacent gimbal legs.

14 Claims, 9 Drawing Figures

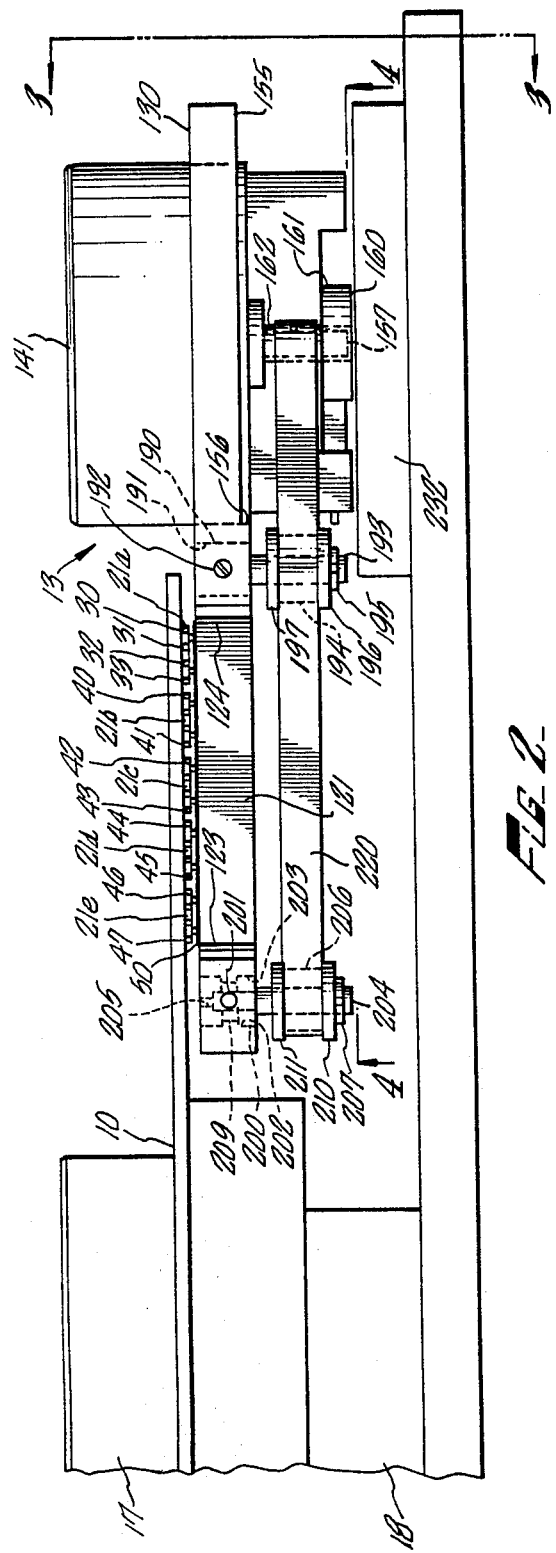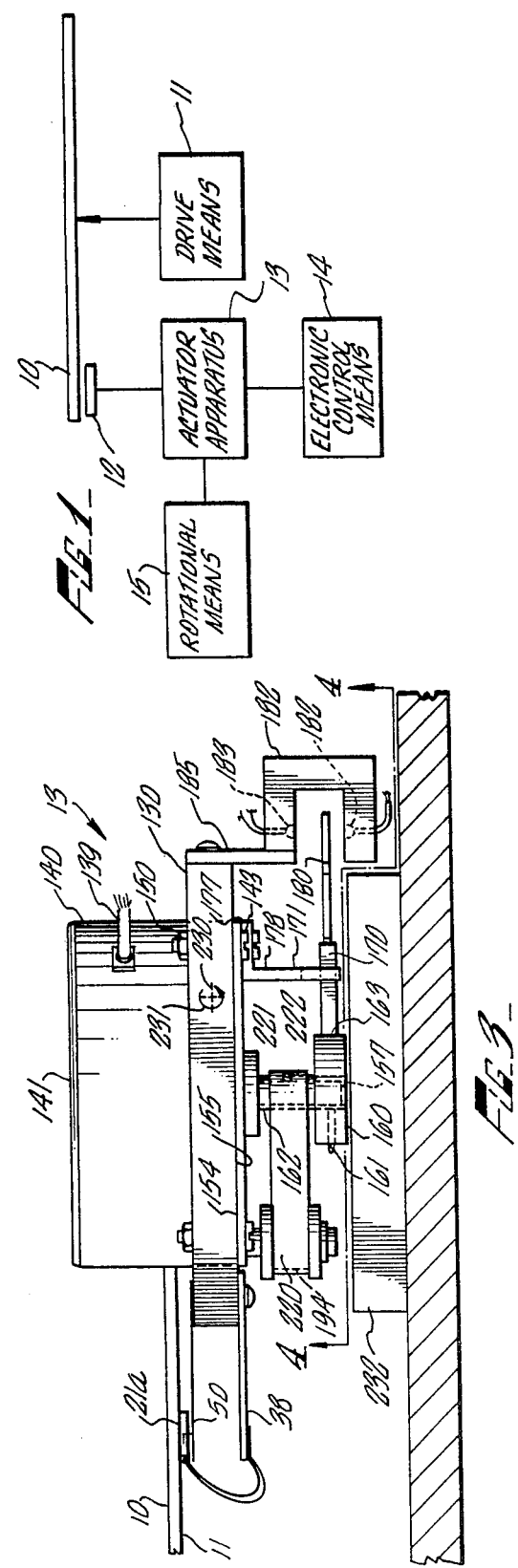

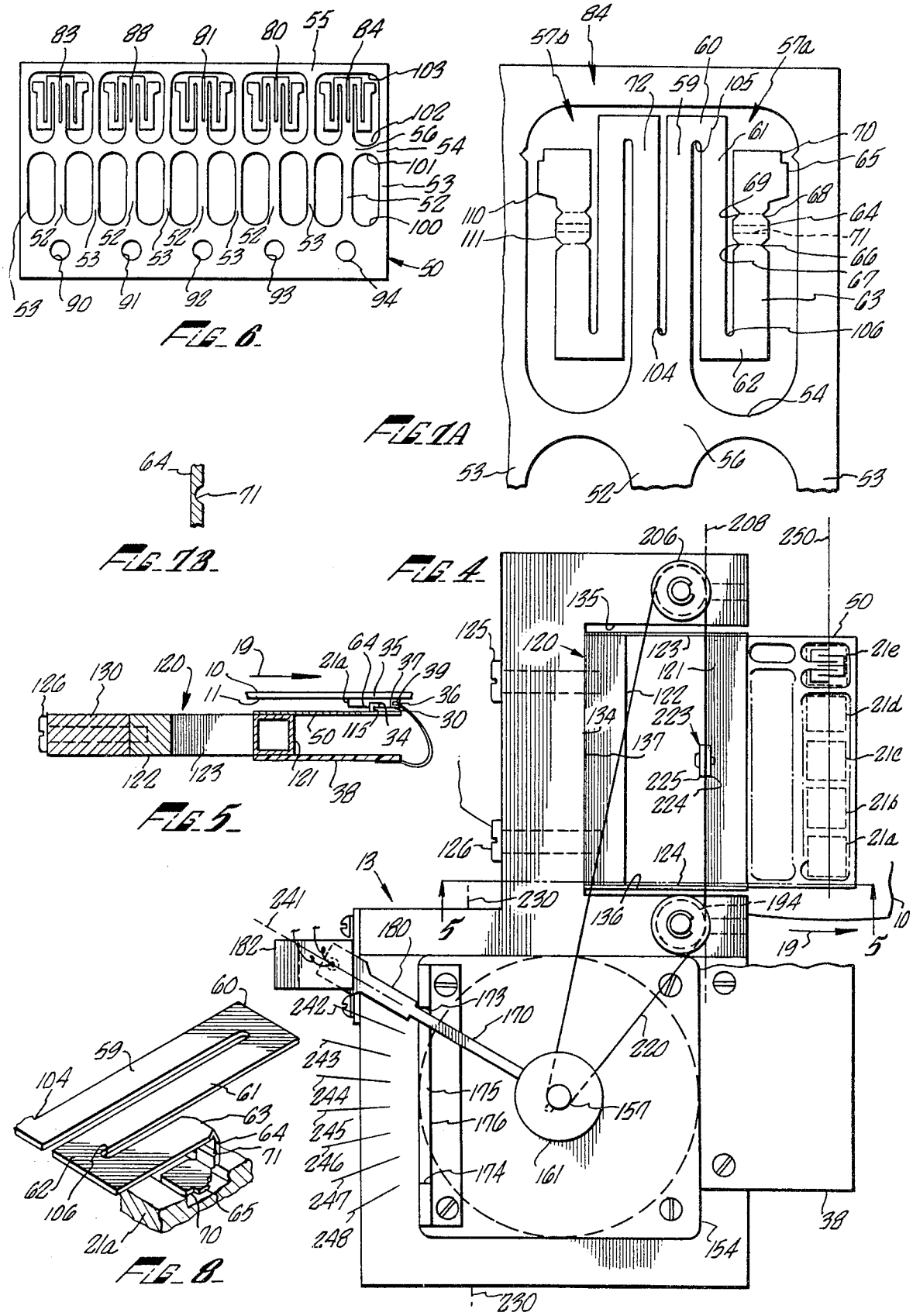

SUSPENSION DEVICE FOR MAGNETIC TRANSDUCERS

This invention relates generally to magnetic disc recording systems and more particularly to a suspension spring device for supporting a plurality of magnetic heads against a moving magnetic disc surface.

Reference is made to the following co-pending applications concurrently filed with this application: Ser. No. 44,535, filed June 1, 1979 and entitled "Actuator Apparatus for Magnetic Disc Recording Systems"; Ser. No. 44,533, filed June 1, 1979 and entitled "Gas Circulation and Filtration Apparatus for Magnetic Disc Recording Systems"; and Ser. No. 44,534, filed June 1, 1979 and entitled "Isolated Multiple Core Magnetic Transducer Assembly." The above-referenced applications are assigned to the same assignee as this application and disclose and claim subject matter related to the present application.

Magnetic disc recording systems commonly utilize one or more magnetic heads that are urged toward a rotating magnetic disc by suspension devices of various designs. The magnetic heads ride against a fluid bearing formed between the magnetic heads and the rotating disc, allowing the magnetic heads to follow surface imperfections within the rotating disc. Magnetic heads of this type are often referred to as "flying" heads.

In order to allow the magnetic heads to more freely ride against the fluid bearing, most suspension devices commonly used include a gimbal means that allows the magnetic heads freedom of rotation in two axes but restricts rotation in a third access normal to the disc surface. Additionally, some suspension devices provide leaf springs that urge the gimbal and magnetic head against the fluid bearing.

For example, U.S. Pat. Nos. 3,581,298 and 3,582,920 disclose support devices formed from a single thickness of resilient material that is used to support a single magnetic head. U.S. Pat. No. 3,593,330 also describes a support device formed from a single thickness of resilient material that is used in combination with a second identical support device to position a plurality of magnetic cores against a rotating disc. Support devices utilizing separate springs to urge a magnetic core or a plurality of magnetic heads against a rotating disc are described in U.S. Pat. Nos. 3,599,193 and 4,141,050. As can be seen, none of the described suspension devices provide both gimbal support and leaf spring pressure loading for a plurality of magnetic heads in one easily formed thickness of resilient material.

The device of the present invention overcomes these limitations and generally comprises a suspension spring that has a base member, a plurality of adjacent gimbal sets, and a plurality of leaf spring members connecting the base area and the gimbal sets. Each gimbal set includes a left and right sinuous gimbal member which are comprised of a plurality of laterally adjacent gimbal legs joined at alternating ends to define the sinuous form. Magnetic heads are bonded to extension segments that extend from the outer ends of the sinuous gimbal members. The centers of the sinuous gimbal members are joined to the leaf spring members for urging the gimbal sets and the magnetic heads toward the surface of a rotating disc. The gimbal sets allow the magnetic heads to ride along the surface of the rotating disc but limit rotation of the magnetic heads about an axis normal to the surface of the disc.

It is thus an object of the present invention to provide an improved magnetic head suspension device.

It is a further object of the present invention to provide a magnetic head suspension device that is easily and inexpensively manufactured.

It is another object of the present invention to provide a magnetic head suspension device that includes both support and spring loading.

These and other objects and advantages of the present invention will be apparent from the following description and accompanying drawings.

IN THE DRAWINGS

FIG. 1 is a block diagram of a magnetic disc recording system that incorporates the suspension device of the present invention.

FIG. 2 is a side view of the actuator assembly.

FIG. 3 is an end view of the actuator assembly.

FIG. 4 is a view of the actuator assembly as taken substantially through lines 4—4 of FIGS. 2 and 3.

FIG. 5 is a view of a magnetic head, the suspension device and the parallelogram as taken substantially through lines 5—5 of FIG. 4.

FIG. 6 is a top view of the suspension device prior to forming the extension segments and pads.

FIGS. 7a and 7b are enlarged views of portions of a suspension device gimbal set.

FIG. 8 shows the suspension device after forming the exterior segments and pads.

DETAILED DESCRIPTION OF THE INVENTION

Referring first to FIG. 1, a magnetic disc system incorporating one embodiment of the actuator of the present invention is shown therein in substantially block diagram form. A rigid disc 10, coated on at least one side with a suitable magnetically active material is supported at and rotated about its central axis by a drive means 11. A plurality of magnetic heads 12, mounted on and supported by an actuator apparatus 13, are positioned near the magnetically susceptible portion of the disc 10, for example, beneath the disc 10.

The drive means 11 rotates the disc 10 at a rate of, for example, 3600 rpm, thereby moving the disc 10 past the heads 12. In this manner information supplied to the heads 12 may be recorded on that portion of the magnetic disc which passes under the heads 12; conversely, information previously stored on the portion of the disc 10 passing under the heads 12 may be retrieved, or read, from the disc 10. The portion of the disc 10 passing under a single one of the heads 12 is commonly referred to as one track; a conventional disc 10 may have as many as one-hundred sixty tracks.

To permit all of the storage area on the disc to be utilized, it is necessary to move the heads 12 across the disc 10. To accomplish this, an electronic control device 14 supplies signals to the actuator apparatus 13 which causes the magnetic heads 12 to be moved transversely across the disc along a path which is substantially a radius of the disc 10, thereby repositioning the heads 12 under different tracks of the disc 10.

With reference now to FIG. 2, the magnetic recording rigid disc 10, coated on a least one side with a suitable magnetically active material 16, is clamped at its center by hub 17 which may, for example, be mounted to the shaft of motor 18. The motor 18, when energized, causes the disc 10 to rotate in the direction shown by arrow 19 (FIG. 4). In order to record magnetic information onto the surface of disc 10 or to recover magnetic information from the surface of disc 10, the actuator apparatus generally designated 13 positions magnetic heads 21a–e near the magnetically active material of disc 10 by means of a suspension spring 50. The suspension spring 50 is supported by a parallelogram shaped supporting strucure 120 which includes an inner member 122 affixed to an actuator base plate 130 and an outer member 121 that is resiliently attached to the inner member 122 by two flat springs 123 and 124. The actuator base plate 130 also supports a stepper motor 141 and a drive band 220. The drive band 220 is clamped to the outer member 121 by a clamp 223 and is connected to the shaft 157 (FIG. 3) of the stepper motor 141 by a drive hub 160. The drive hub 160 transfers the rotational displacement of the shaft 157 to the drive band 220 which converts this movement into a linear displacement that is coupled to the outer member 121, the suspension spring 50, and the magnetic heads 21a–e (FIG. 4) A detailed understanding of the actuator apparatus 13 will be obtained through the description that follows.

The magnetic heads 21a–e (FIG. 2) are used to record and recover magnetic information from the surface of disc 10. The magnetic heads are preferably of the Winchester type, that is, a low-mass magnetic head that is separated from the disc during operation by a fluid bearing produced as a result of the disc rotation. An exemplary magnetic head has four magnetic cores 30 through 33 with a nominal center-to-center core separation distance equal to eight times the center-to-center distance between two adjacent tracks of information recorded on disc 10, or by way of example, the nominal center-to-center distance between nine tracks of information. Co-pending application Ser. No. 44,534 filed June 1, 1979 describes such an exemplary magnetic head.

As shown in FIG. 5, notch 34 is formed into the magnetic head 21 and each core 30–33 has a gap 37. Magnetizing coils 36 are individually wound around cores 30 through 33 and are connected to a switching board 38 which contains the necessary switching circuitry for selecting the one core out of the twenty cores contained on magnetic heads 21a–e that will be active during a given read or write operation. The switching circuitry may utilize, for example, switching diodes to achieve the desired selection.

The suspension spring 50, shown generaly in FIG. 2 and illustrated in detail in FIG. 6, comprises a plurality of primary members designated typically at 52 and a plurality of secondary members 53 that connect at one end to spring base area 51. Approximately halfway along the length of secondary members 53, inner cross-members 54 join an outer pair of secondary members 53 to a single inner primary member 52 at an intersection 56. The suspension spring 50 may be formed by a suitable process, such as etching, from a resilient material which may be phosphor bronze or other suitable material.

The primary member 52, as better seen in FIG. 7, extends beyond intersection 56 and is split to form a right serpentine gimbal and a left serpentine gimbal, generally designated 57a and 57b, respectively. The right serpentine gimbal 57a is formed by first through fifth serpentine gimbal legs 59 through 63 respectively, wherein the first, third and fifth gimbal legs 59, 61, and 63 lie generally parallel to the axis of primary and secondary members 52 and 53, and second and fourth gimbal legs 60 and 62 lie substantially parallel to inner cross-member 54 and perpendicular to primary and secondary members 52 and 53. One end of second gimbal leg 60 connects to an end of the first gimbal leg 59 and the remaining end of second gimbal leg 60 connects to a first and of third leg 61. A first end of fourth gimbal leg 62 connects to the remaining end of third gimbal leg 61. The remaining end of fourth gimbal leg 62 connects to a first end of the fifth gimbal leg 63. The second and fourth gimbal legs 60 and 62 are substantially shorter than the first, third and fifth gimbal legs 59, 61 and 63 so as to form a generally compressed serpentine design.

The remaining end of the fifth gimbal leg 63 is attached to an extension segment 64 which is in turn attached to a pad 65. Between the fifth gimbal leg 63 and the extension segment 64 are formed notches 66 and 67 at each edge of the extension segment 64 and fifth gimbal leg 63. Similarly, between the extension segment 64 and pad 65 and at each edge of segment 64 and pad 65, are formed notches 68 and 69. Notches 66 and 67 define a boundary between fifth gimbal leg 63 and extension segment 64, and notches 68 and 69 define a boundary between extension segment 64 and pad 65. The purpose of the boundaries will be explained below with the reference to FIG. 8. The width of pad 65 is substantially wider than extension segment 64 or fifth gimbal leg 63, so as so as to better bond pad 65 to magnetic transducer 21a as will be made clear hereinafter in further discussion of FIG. 5.

The notch 70 is formed at the outer corner of pad 65. The notches 66–69 are generally triangular in shape while notch 70 is generally rectangular in shape. A groove 71, having a curved cross section as shown in the enlarged side view of FIG. 7, is preferably formed in the extension segment 64. The groove 71 may be suitably formed by exposing the grooved portion of extension segment 64 to the etching solution during the last stages of the formation of suspension spring 50.

Left serpentine gimbal 57b (FIG. 7) is a mirror image of right serpentine gimbal 57a and is otherwise identical to right serpentine gimbal 57a in detail. Four additional sets of right and left serpentine gimbals 80 through 83 (FIG. 6) are etched into suspension spring 50, each set being formed at one end of a primary member 52. Each secondary member 53 extends beyond second gimbal leg 60 and all secondary members 53 are joined together by five outer cross-members 55. Each gimbal set 80 through 84 is thus enclosed in an area defined by inner cross member 543, secondary members 53 and outer cross-members 55.

Circular holes 90 through 94 (FIG. 6) are formed into spring base area 51 substantially on the center lines of primary members 52. In a preferred embodiment, the primary members 52 and secondary members 53 are smoothly joined by the spring base area 51 to form a radius 100. Similarly, the primary members 52 and secondary members 53 are smoothly joined on either side of the inner cross-member 54 to form radii 101 and 102, respectively. Another radius 103 provides a smooth junction between the secondary members 53 and the outer cross-member 55, while a radius 104 (better seen in FIG. 7) is formed to join the primary members 52 to the first gimbal legs 59 and 72. The first, second and third gimbal legs 59–61 are joined in a similar manner by a radius 105, while a radius 106 results from the junction of the third, fourth and fifth gimbal legs 61–63.

After the etching process is completed to form the suspension spring 50 as shown in FIG. 7, each of the extension segments 64 is bent at the notches therein to form an angle as better shown in FIG. 8. More particularly, the extension segments 64 are bent downward along the boundary defined by notches 66 and 67 to form a ninety degree angle-between the extension segment 64 and the gimbal legs 61, 62 and 63. The pads 65 are then bent ninety degrees at the boundary defined by notches 68 and 69 to cause the pads to form a plane which is substantially parallel to the plane defined by the body of the suspension spring 50, and spaced therefrom at a distance equal to the distance between the boundaries defined by the notches 66-67 and 68-69. FIG. 8 thus illustrates one completely formed extension segment 64 and pad 65, with the remaining pads and extension segments of the suspension spring 50 being substantially identical.

Once the suspension spring 50 is completed, the magnetic heads 21a-e are mounted on the pads 65 thereof. More specifically, each of the magnetic heads 21a-e is aligned such that the gaps 37 are perpendicular to the axis of first gimbal legs 59 and 72, and is then positioned such that the cores 30-33 and the trailing edge 39 of the heads 21a-e are nearest the downstream side 115 of the extension segments 64. When this orientation is achieved, the pads 65 are bonded to the notches 34 in the magnetic heads 21a-e in any conventional manner. To ensure precise alignment among all of the magnetic heads 21a-e, the heads are preferably simultaneously aligned in a jig while being bonded. As the result of such alignment, the distances between any two adjacent cores is equal, whether on the same head or on adjacent heads, with the nominal center-to-center spacing between adjacent cores being, for example, the nominal center-to-center spacing between nine tracks of information on the disc 10.

With respect to FIG. 4, the actuator base plate 130 comprises a plate member 131 preferably formed integrally with a support member 132 and an eccentric pulley mounting arm 133. The plate member 131 is preferably rectangular or square in shape and the support member 132 extends in a substantially orthogonal manner from the center of one edge of the plate member 131. The eccentric pulley mounting arm 133 extends substantially perpendicular to the support member 132, thereby cooperating with the plate member 131 and support member 132 to define a rectangular area 134. One wall 135 of the rectangular area 134 is formed by a side of the eccentric pulley mounting arm 133. A second and opposite wall 136 of area 134 is similarly formed by a side of the support member 132. The longer dimension of rectangular area 134 is determined by parallelogram support member 132 and the wall 137.

A parallelogram shaped supporting structure 120, best seen in FIG. 4, is disposed within the rectangular area 134 and comprises an inner member 122, a pair of spring members 123 and 124 connected thereto, and an outer member 121 affixed to the ends of the spring members 123 and 124, which may be flat. The spring members 123 and 124 which preferably extend substantially orthogonal to both the inner member 122 and the outer member 121, may be affixed thereto by any suitable means such as brazing or welding. The inner member 122, which may for example have a solid square cross-section, is affixed to the wall 137 of the support member 132. The outer member 121 may have, for example, a substantially square tubular cross-section as seen in FIG. 5, with one flat outer edge 127 generally parallel to one surface of the actuator base plate 130.

One side of base area 51 of suspension spring 50 is mounted to flat surface 127 and the opposite side of spring base area 51 and suspension spring 50 is adjacent to the disc 10. The extension segment 64 of FIG. 8 and the pad 65 thus extend from the side of suspension spring 50 that is adjacent to disc 10. The pad pairs 65 of each gimbal set 80-84 urge the magnetic heads 21a-e toward the fluid bearing surface of the disc 10. Sufficient clearance (FIG. 4) between the walls 135 and 136 of the rectangular area 134 and the spring members 123 and 124, respectively, is provided so that parallelorgram outer member 121 is free to move suspension spring 50 and magnetic heads 21a-e through a distance equal to at least the distance between eight tracks of magnetic information stored on disc 10.

The stepper motor 141 (FIG. 3) is mounted to the actuator base plate 130 by means of four screws 143 and nuts 150 or other suitable means. A stepper motor cylindrical case 140 fits through a notched circular hole 142 that is formed into the actuator base plate 130, and a stepper motor square mounting flange 154 fits within a recess defined by the surfaces 155 and 156 of the actuator base plate 130 (FIG. 2). The stepper motor shaft 157 protrudes from the same side of stepper motor 141 as the mounting flange 154 and is generally perpendicular to actuator base plate surface 155. The shaft 157 extends away from a plane defined by disc 10. An exemplary stepper motor is model number SM40-480 manufactured by Fuji of Japan and available through Rock Associates of Buena Park, Calif.

A drive hub 160 (FIG. 3) is attached to the stepper motor shaft 157 by means of pin 161 that passes radially through hub 160 and extends into a corresponding hole formed into shaft 157. The drive hub 160 is formed to include a first and smaller diameter hub 162 nearest stepper motor 141 on shaft 157, and a second and larger diameter hub 163 farther from stepper motor 141. A stop arm 170, having, for example, a solid circular cross-section, is attached to the larger hub 163 and extends radially from the shaft 157. Stop plate 171 which may be formed from suitable L-shaped angle stock and which is secured to actuator base plate surface 155 includes a first leg 177 that is formed at a right angle to the second leg 178. The second leg 178, which extends perpendicular to actuator base plate 130, includes a rectangular cut out area 176 (FIG. 4) defined by a first end stop 173, a second end stop 174 and an edge 175. The stop arm 170, which extends radially from the shaft 157 and passes through the rectangular cut out area 176, moves between first end stop 113 and second end stop 174 in accordance with the rotation of the shaft 157. Further movement of stop arm 170 is restricted when the stop arm 170 abuts either first end stop 173 or second end stop 174, thus limiting the angle of rotation through which shaft 157 may travel. Attached to a second end of stop arm 170 and extending coaxially therefrom is flag 180 formed from a suitable flat, stiff material, such as opaque plastic, and affixed generally parallel to the plane of the disc 10.

A generally U-shaped optical detector 182 (FIG. 3), such as a type OPB 804 manufactured by Optron, Inc. is attached to actuator base plate 130 by means of bracket 185 and is positioned with the U-shape of optical detector 182 opening toward stepper motor 141. Optical detector 182 has a light source 183 in a first leg of the U and a detector 184 in the second leg. When the shaft 157 has rotated stop arm 170 to be proximate to the first end stop 173, the flag 180 is disposed within the U-shaped optical detector 182, interrupting the light detected by detector 184 from source 183 and thus providing a signal from detector 184 which may be used by the electronic means 14 to establish a zero or home position for shaft 157 for use in subsequent control of the stepper motor 141.

Continuing with the description of the actuator apparatus 13 as shown in FIG. 2, a cylindrical pulley shaft base 190 is secured by a set screw 192 into a correspondingly cylindrical hole 191 that is formed into the actuator base plate 130. Extending coxially from the pulley shaft base 190 is a pulley shaft 193 which is substantially parallel to the shaft 157. The pulley 194 is disposed concentrically over the shaft 193 and is retained by a clip spring 195 so as to freely rotate about the shaft 193. Similarly, the cylindrical shaft base 200 is secured by means of a set screw 201 within correspondingly cylindrical hole 202 formed into the actuator base plate 130. An annular groove 209 formed into the pulley shaft base 200 receives an end of the set screw 201 to position the pulley shaft base 200 within the actuator base plate 130. A hole 203 is formed off-center within the pulley shaft base 200. A pulley shaft 204 is affixed within the hole 203 and extends from the shaft base 200. A groove 205 is formed across a diameter of the pulley shaft base 200 in a side of the shaft base 200 opposite the extension of the pulley shaft 204. A pulley 206 is disposed over the pulley shaft 204 and held in place by a clip spring 207 so as to rotate freely about the pulley shaft 204. A line 208 (FIG. 4) drawn between the outer surface of the pulley 194 and the pulley 206 is substantially parallel to the outer member 121.

A drive band 220 (FIG. 2) is formed from a suitably inelastic but flexible material such as 0.0015-inch thick grade 302 stainless steel. The drive band 220 has overlapping ends that are welded or bonded to form a continuous loop around the circumferences of the smaller hub 162 and pulleys 194 and 206. End flanges 196, 197, 210 and 211 of the pulleys 194 and 206 support the drive band 220, thus centering and retaining drive band 220 upon the pulleys 194 and 206. A pin 221 (FIG. 3) is affixed to smaller hub 162 and engages an orifice 222 formed into drive band 220 to positively couple the rotational movement of the shaft 157 and the smaller hub 162 to the drive band 220, thereby converting the rotational movement of the shaft 157 into a linear displacement of the drive band 220.

A first portion 224 (FIG. 4) of a clip 223 is affixed to the side wall of the parallelogram outer member 121 that is within the interior region 134 generally defined by the supporting structure 120 and extends therefrom generally perpendicular to and away from disc 10. The extension of a first portion 224 contacts the outer surface of drive band 220. A second portion 225 of the clip 223 is disposed adjacent to the inner surface of the drive band 220 and is secured to the first portion 224, thereby clamping the drive band 220 to the outer member 121 and transferring any linear displacement of the drive band 220 generally along the line 208 to the outer member 121.

To ensure proper positioning of the heads with respect to the rotation of the shaft 157, the tension on the drive band may be adjusted. Referring to FIG. 2, to adjust the tension on drive band 220, set screw 201 is loosened and pulley shaft base 200 is rotated within actuator base plate 130 by means of, for example, a blade screwdriver that engages the groove 205. As the pulley shaft base 200 is rotated, the pulley shaft 204 affixed in eccentrically located hole 203 and the pulley 206 move in a circular path defiend by the axis of the eccentrically located hole 203, thereby effectively changing the overall path length defined by the smaller hub 162, pulley 194 and pulley 206. Since the drive band 220 is of a fixed length, the rotation of the pulley shaft base 200 will serve to adjust the tension in the drive band 220. Once a suitable tension is achieved, the set screw 201 is tightened into the annular groove 209, securing the pulley shaft base 200.

Rotational means 15, as shown in the block diagram of FIG. 1, may include a solenoid or a gear drive means affixed to mounting plate 232 (FIG. 3) that supports actuator base plate 130 along an axis 230 (FIG. 4) to position magnetic heads 21a–e against disc 10 while disc 10 rotates. The solenoid or gear drive means then rotates actuator base plate 130 in the direction of arrow 231 (FIG. 3) when disc 10 ceases rotation. This rotational displacement is sufficient to withdraw magnetic heads 21a–e from their operational position near the surface of disc 10. If the rotational means 15 are not provided, the highly polished surface of disc 10 may bond to the similarly highly polished fluid bearing surface 35 (FIG. 5) of magnetic heads 21a–e when disc 10 is not rotating; furthermore, the magnetically active material 11 may be worn away from the surface of disc 10 if magnetic heads 21a–e vibrate while at rest against disc 10 as may occur, for example, during the shipping or moving of a completed disc drive system employing the above-described actuator apparatus 13.

The operation of the above-described actuator apparatus 13 will now be described. During operation of the actuator apparatus 13, the actuator base plate 130 is positioned, by the rotational means 15 described above, substantially parallel to disc 10, thus urging magnetic heads 21a–e toward the surface of disc 10.

During operation of a magnetic disc system incorporating the actuator of the present invention, as shown in FIG. 1, the plate 130 is positioned, by the rotational means 15 described above, substantially parallel to the disc 10, thus urging the magnetic heads 21a–e toward the surface of the disc 10. Due to the equilibrium which results between the suspension spring 50 (which urges the heads toward the disc surface) and the fluid bearing (which forms due to the aerodynamics of the heads 21a–e and the relative motion imparted between the disc 10 and heads 21a–e), the low mass flying heads 21a–e do not touch the surface of the disc but instead closely follow the contours of the disc. The thickness of the fluid bearing, or the distance from the disc 10 to the head 21a–e, decreases as the force of the suspension spring increases.

Control signals are provided to stepper motor 141 through connecting wires 239 from an electronic control device 14 as described with regard to FIG. 1 above. The control signals energizes the stepper motor 141, causing it to rotate the shaft 157, drive hub 160, stop arm 170 and flag 180 one angular position or "step" at a time to one of eight angular positions. The first such angular position 241 is achieved when the stop arm 170 is adjacent to the first end stop 173 and flag 180 is disposed within the optical detector 182. The eight angular position 248 is achieved when the stop arm 170 is adjacent to second end stop 174. The remaining angular positions 242 through 247, respectively, each represent one "step" of stepper motor 141 and the angular displacement between each angular position 242 through 248 is essentially equal.

The drive band 220 (FIG. 4) translates the angular displacement of smaller hub 162 into a corresponding linear displacement which is a result of the angular displacement and diameter of the smaller hub 162. The linear displacement of the drive band 220 is coupled through the clip 223 to the parallelogram outer member 121, which is relatively free to move at the ends of the flat springs 123 and 124 in a path that remains essentially parallel to the parallelogram inner member 122. The parallelogram outer member 121 and parallelogram inner member 122 are positioned by the actuator baseplate 130 to be parallel to a radius 250 of disc 10 and thus the outer member 121 moves along a path that is essentially parallel to a radius 250. The displacement of the outer member 121 along this parallel path is equal to the linear displacement of the drive band 220 as coupled to the outer member 121 through the clip 223. In this manner the eight angular positions 240 through 248 are translated into eight positions of the outer member 121 parallel to radius 250, with the first angular position 241 corresponding to a position of the outer member 121 nearest the pulley 194 and the eighth angular position 248 corresponding to a position of the outer member 121 nearest the pulley 204.

The positions assumed by the parallelogram outer member 121 are transferred to the suspension spring 50 that is affixed to the outer member 121. These positions in turn are transferred to the magnetic heads 21a–e. The distance between each adjacent position assumed by the outer member 121 is equal to the nominal center-to-center distance between two adjacent tracks of information stored on the surface of disc 10. As described above, the nominal center-to-center distance between adjacent magnetic cores shown typically at 30 through 33 is equal to the nominal center-to-center distance between nine tracks of information recorded on disc 10. Thus, as outer member 121 is moved through its range of eight positions, the twenty magnetic cores on magnetic heads 21a–e will be moved across 160 tracks of recorded information on disc 10 in groups of 20 tracks per position.

For example, when the stepper motor 141 is adjusted to assume the first angular position 241, the magnetic core 30 of magnetic head 21a will be positioned over the first track of magnetic information nearest the outer edge of disc 10, the magnetic core 31 will be positioned over the ninth track of magnetic information, and so on. If stepper motor 141 is adjusted to angular position 242, magnetic cores 30 and 31 will be moved toward the center of disc 10, coming to rest over the second and tenth tracks of recorded information. As stepper motor 141 is stepped through remaining angular positions 243–248, magnetic cores 30 and 31 will be positioned over the third through the eighth and the eleventh through the sixteenth tracks, respectively. The remaining magnetic cores will be similarly positioned over a total of 160 tracks.

The right serpentine gimbal 57a and left serpentine gimbal 57b of the first gimbal set 84 (FIGS. 7 and 8) provide the gimbal 58 of first gimbal set 84 (FIGS. 5 and 6) provide the gimbal movement required by magnetic head 21a so that the magnetic head 21a will remain aligned with the tracks of information on the surface of the disc 10. By way of example, the pad 65 of the right serpentine gimbal 57a may be moved toward or away from the surface of the disc 10 (FIG. 5) by flexing first through fifth gimbal legs 59–63; pad 65 (FIGS. 7 and 8) may also be rotated substantially freely about an axis parallel to a radius of the disc 10 and parallel to the surface of the disc 10 by primarily flexing the extension segment 64. The groove 71 formed into the extension segment 64 aids this flexing motion. As described above, the magnetic head 21a is bonded to and supported by pads 65 of right serpentine gimbal 57a and left serpentine gimbal 57b, respectively. As the magnetic head 21a is urged against the disc 10 by the suspension spring 50, the right and left serpentine gimbals 57 and 58 of the first gimbal set 84 will allow the magnetic head 21a to rotate about an axis parallel to the surface of disc 10, that is, to "roll" from side to side. Right and left serpentine gimbals 57 and 58 will further allow the magnetic head 21 to rotate about an axis that is parallel to a radius of the disc 10 and parallel to the surface of the disc 10, that is, to "pitch." These movements allow the magnetic head 21a to ride on the fluid bearing over imperfections in the surface of the disc 120. However, right and left serpentine gimbals 57a and 57b will restrict the motion of the magnetic head 21a about an axis that is normal to the surface of the disc 10, that is, to "yaw." This yaw movement must be restricted so that the gaps 37 of the magnetic heads 21a–e will remain aligned with the information tracks on the surface of the disc 10. Gimbal sets 80 through 83 (FIG. 6) function as does gimbal set 84. Thus, suspension spring 50 provides the necessary pressure loading means and the gimbal support means required to properly suspend magnetic heads 21e against the rotating disc 10.

Having thus described one embodiment of my invention in detail, it is to be understood that numerous equivalends and alterations which do not depart from the invention will be apparent to those skilled in the art, given the teaching herein. Thus, my invention is not to be limited to the above description but is to be of the full scope of the appended claims.

I claim:

1. A suspension device for supporting a plurality of adjacent magnetic heads against a fluid bearing formed between said magnetic heads and a moving magnetic surface, comprising:

a body member with an axis parallel to the movement of the said moving magnetic surface; and a plurality of adjacent gimbal sets each having a first sinous gimbal member and a second sinuous gimbal member, said first and second sinuous gimbal members each comprising a plurality of laterally adjacent gimbal legs parallel to said axis, each said gimbal leg having a first and second end, said gimbal leg first and second ends alternately joined to form said sinuous gimbal members, said first and second sinuous gimbal members each further having a first and inner end and a second and outer end, said first end inner ends joined in substantially close proximity to said body member, each said first and second sinuous gimbal members further comprising an extension member j ned at a first end to said second and outer ends and xtending therefrom to a bonding surface for bonding to said magnetic heads.

2. A suspension device as in claim 1 wherein said bonding surface includes a pad disposed at a second end of said extension member and generally parallel to said first and second sinuous gimbal members for abuting said magnetic heads.

3. A suspension device as in claim 1 wherein said body member comprises a base area adapted to be affixed to support means, and a plurality of leaf spring members joining said base area to said first and inner ends.

4. A suspension device as in claim 3 wherein said leaf spring members are parallel to said axis.

5. A suspension device as in claim 1 wherein said body member and said gimbal sets are formed from a single thickness of resilient material.

6. A suspension device as in claim 1 wherein said extension members have formed therein a groove parallel to said moving magnetic surface and intermediate said bonding surface and said second and outer end for increasing the flexural freedom therein.

7. A suspension device for supporting a plurality of adjacent magnetic heads against a fluid bearing formed between said magnetic heads and a moving magnetic surface, comprising,
 a body member with an axis parallel to the movement of said moving magnetic surface, said body member comprising a base area adapted to be affixed to support means, and a plurality of leaf spring members having first ends joined to said base area, and having second and opposite ends; and
 a plurality of adjacent gimbal sets each having a first sinuous gimbal member and a second sinuous gimbal member, said first and second sinuous gimbal members each comprising a plurality of laterally adjacent gimbal legs parallel to said axis, each said gimbal leg having a first and second end, said gimbal leg first and second ends alternately joined to form said sinuous gimbal members, said first and second sinuous gimbal members each further having a first and inner end and a second and outer end, said first and inner ends joined in substantially close proximity to said second ends of said leaf spring members, each said first and second sinuous gimbal members further comprising an extension member joined at a first end to said second and outer free ends and extending therefrom to a bonding surface for bonding to said magnetic heads; and said body member and said gimbal sets are formed from a single thickness of a resilient material.

8. A suspension device as in claim 7 wherein said leaf spring members are parallel to said axis.

9. A suspension device as in claim 7 wherein said extension members have a groove formed therein parallel to said magnetic surface and intermediate said bonding surface and said second and outer ends for increasing flexure freedom therein.

10. A suspension device for supporting a plurality of magnetic heads for coaction with a moving magnetic surface comprising
 a body member disposed with an axis parallel to the movement of the moving magnetic surface,
 at least one gimbal set supported by said body member, at least one gimbal set having first and second sinuous members and each said sinuous member including a plurality of connected gimbal members, and
 a plurality of bonding pads, each of said first and second sinuous members being connected to a bonding pad adapted for mounting at least one magnetic head thereon.

11. The suspension device of claim 10 including a plurality of said gimbal sets.

12. The suspension device of claim 10 wherein said body member includes a plurality of spring members, each of said gimbal sets being supported on one of said spring members such that said first and second sinuous members are disposed symmetrically with respect to the associated spring member.

13. The suspension device of claim 12 wherein said sinuous members include an extension member disposed substantially perpendicular to the remaining portions of said sinuous members, said bonding pads being connected to the ends of said extension members and disposed in a plane which is substantially parallel to the plane of said sinuous members.

14. The suspension device of claim 10, 11, 12, or 13 wherein said body member and said gimbal sets are formed from a single thickness of resilient material.

* * * * *